United States Patent [19]
Kerfoot et al.

[11] 3,933,201
[45] Jan. 20, 1976

[54] METHOD USING OVERBASED BRANCHED-CHAIN ALKYLAROMATIC SULFONATES AS WATERFLOOD ADDITIVES

[75] Inventors: Oliver C. Kerfoot; Charles R. Clark, both of Ponca City, Okla.; Carl D. Kennedy, San Diego, Calif.

[73] Assignee: Continental Oil Company, Ponca City, Okla.

[22] Filed: Oct. 11, 1974

[21] Appl. No.: 513,919

Related U.S. Application Data

[62] Division of Ser. No. 350,552, April 30, 1973, abandoned.

[52] U.S. Cl............. 166/275; 166/270; 166/305 R; 252/8.55 D
[51] Int. Cl.²......................................... E21B 43/22
[58] Field of Search................ 166/270, 273–275, 166/305 R, 300; 252/8.55 D

[56] References Cited
UNITED STATES PATENTS

| | | | |
|---|---|---|---|
| 3,348,611 | 10/1967 | Reisberg | 166/275 |
| 3,480,080 | 11/1969 | Murphy | 166/274 |
| 3,799,263 | 3/1974 | Prillieux et al. | 166/275 |
| 3,847,823 | 11/1974 | Clark et al. | 166/305 R |

*Primary Examiner*—Stephen J. Novosad
*Assistant Examiner*—George A. Suckfield
*Attorney, Agent, or Firm*—F. Lindsey Scott

[57] ABSTRACT

An improved anionic waterflood additive is prepared by alkylating an aromatic hydrocarbon such as benzene with a branched-chain alkene having about 10 to about 35 carbon atoms such as a propylene tetramer dimerization reaction product in the presence of an alkylation catalyst such as $AlCl_3$; sulfonating the thus formed alkylate product or a fraction thereof to form a sulfonic acid; converting the sulfonic acid to a sulfonate by reacting with a base component such as an alkali metal hydroxide, ammonium hydroxide, or an alkali metal carbonate; and overbasing the sulfonate by admixing with an excess of base component such that the ratio; "weight of excess base component/weight of sulfonate" is about 0.03 to about 3.0. The anionic waterflood additive is injected into a petroliferous formation, the formation is waterflooded, and oil is recovered.

4 Claims, No Drawings

METHOD USING OVERBASED BRANCHED-CHAIN ALKYLAROMATIC SULFONATES AS WATERFLOOD ADDITIVES

This is a division of application Ser. No. 350,552, filed Apr. 30, 1973, now abandoned.

BACKGROUND OF THE INVENTION

1. Field of the Invention

In one aspect, this invention relates to an anionic waterflood additive.

In another aspect, this invention relates to a process for the recovery of hydrocarbons from a petroliferous formation involving injecting into a petroliferous formation an improved anionic waterflood additive plus water.

2. Brief Description of the Prior Art

A large percentage of the oil in petroliferous formations is held within the rock of the formation by the surface forces between the formation rock, the oil therein, and the aqueous liquid in the formation. As a result, a substantial portion of such oil usually remains in the formation even when the wells traversing the formation are no longer productive. Various secondary recovery techniques, such as thermal recovery, gas injection, and waterflooding have been suggested for the recovery of this fixed oil which remains in the formation after primary recovery methods are no longer feasible to produce additional oil. As a secondary recovery technique, waterflooding is quite commonly employed, and a multiplicity of methods have been suggested for improving efficiency and economy of oil recovery by the practice of waterflooding. Such methods frequently include incorporation of a water-soluble surfactant in the waterflood liquid which is injected into the petroliferous formation. A number of typical surfactants have been proposed for this purpose, including alkyl pyridinium salts, sodium lauryl sulfate, certain sulfonates, glycosides, sodium oleate, quaternary ammonium salts, and the like. The use of such surfactants has arisen because it is widely recognized that a low interfacial tension between the surfactant flood water and the reservoir crude oil is beneficial to the improvement of recovery efficiencies and feasibilities.

Recently, it has been proposed that nonionic surfactant solutions, such as a polyoxyethylene-polyoxypropylene copolymer containing solution be injected into the formation through a first of a series of two well bores to thereby displace the hydrocarbons in the formation toward a second well bore. The nonionic surfactant flood is then followed by an injection of a slug of aqueous caustic mixture into the formation through the first well bore to displace the hydrocarbon of the formation and the injected surfactant toward the second well bore. The caustic slug has a basicity of at least 1.5 pH levels greater than that of the native formation waters. However, use of a nonionic surfactant has not fully met the needs of the industry as a desirable waterflood surfactant composition, and new compositions are constantly being sought which will allow recovery of the residual oil remaining in the formation following primary oil recovery operations. Also, the surfactant materials of the prior art have on occasion suffered from lack of availability or from nonfeasibility due to excessive costs, and thus have not entirely satisfied the long-felt need of the industry for a feasible method to recover oil remaining in subterranean petroliferous formations.

OBJECTS OF THE INVENTION

An object of the invention is to provide an improved waterflood additive and a method of using the waterflood additive in the recovery of secondary hydrocarbons from petroliferous formations.

These and other objects, advantages, and features of this invention will become apparent to those skilled in the art from a reading of the following detailed description and claims.

SUMMARY OF THE INVENTION

According to the present invention, we have now found an improved anionic waterflood additive which comprises an overbased sulfonate derived from an alkylate product which in turn is derived from a branched-chain alkene mixture having about 10 to about 35 carbon atoms per molecule and an aromatic hydrocarbon.

Further, according to the invention, we have found that injection of the improved anionic waterflood additive plus water into a petroliferous formation results in recovery of substantial yields of hydrocarbons therefrom.

One method of employing the anionic waterflood additives of the instant invention includes a first step of injecting a slug of an aqueous mixture containing about 0.5 to about 25 weight percent of the overbased sulfonate into a formation through an injection well and thence recovering displaced hydrocarbons from the formation through a production well. Additional hydrocarbons can be recovered, if desired, by injecting an effective amount of an aqueous slug of base component into the petroliferous formation after the overbased sulfonate slug has been injected.

Another method of recovering the hydrocarbons from a petroliferous formation involves injecting a first slug of an aqueous mixture containing about 0.5 to about 25 weight percent of the sulfonate derived from the alkylate product into the petroliferous formation followed by an amount of an aqueous base component containing mixture sufficient to overbase the sulfonate such that the overbased sulfonate is formed in situ by contacting of the aqueous sulfonate containing slug and the aqueous base component containing slug.

DESCRIPTION OF THE PREFERRED EBMODIMENTS

The instant invention relates to an improved anionic waterflood additive. The waterflood additive is prepared by alkylating an aromatic hydrocarbon with a branched-chain alkene having about 10 to about 35 carbon atoms per molecule in the presence of an alkylation catalyst; sulfonating the thus formed alkylate product or a fraction thereof to form a sulfonic acid; converting the sulfonic acid to a sulfonate by reacting with a base component; and overbasing the sulfonate by admixing with an excess of base component such that the ratio: "weight of excess base component/weight of sulfonate" is about 0.03 to about 3.0.

The instant invention also relates to injecting the improved anionic waterflood additive with water into a petroliferous formation to promote the recovery of oil from the formation.

The branched-chain alkene which is employed to alkylate the aromatic hydrocarbon to derive the alkylation product from which the sulfonates of the instant invention are derived can include any branched-chain alkene having about 10 to about 35 carbon atoms. A presently preferred branched-chain alkene is a propylene tetramer dimerization reaction product having predominantly about 20 to about 30 carbon atoms per molecule. Such propylene tetramer dimers can be formed by the process described in U.S. Pat. No. 3,410,925.

Such products are highly branched-chain isomeric compounds and are usually much more so than the theoretical propylene polymer structure shown below:

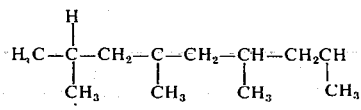

The aromatic hydrocarbon that is alkylated with the branched-chain alkene can be represented as follows:
$Ar—(R')_n$
wherein Ar is a benzene or naphthalene ring having a valence of $n$; wherein $R'$ is methyl or ethyl; and wherein $n$ is 0, 1, or 2. Some examples of suitable aromatic hydrocarbons include benzene, naphthalene, toluene, xylenes, ethylbenzenes, diethylbenzenes, diethylnapthalenes, and the like. Benzene is a particularly suitable aromatic hydrocarbon for forming the alkylates.

The alkylation reaction temperature to produce the alkylates can vary considerably, ranging from about 10° to about 100°C. A temperature range which is particularly suitable is about 20° to about 50°C.

The ratio of aromatic hydrocarbon to the branched-chain alkene can be varied over a wide limit. For example, ratios such as about 1 to about 25 moles of the aromatic hydrocarbon per mole of the branched-chain alkene can be employed. Ratios of about 5:1 to about 10:1 are particularly desirable.

The amount of alkylating catalyst, such as aluminum chloride which is employed for effecting alkylation, can conveniently be based upon the weight of the branched-chain alkene present in the reaction environment. On this basis, about 1 to about 10 percent by weight of aluminum chloride or other Friedel-Crafts catalyst is suitable. Any Friedel-Crafts alkylation catalyst can be employed. Aluminum chloride is particularly suitable. The use of aluminum chloride sludge for recycle is advantageous to the process. By recycling the sludge, less fresh aluminum chloride needs to be added to the reaction environment. This results in considerable savings. Also, better product yields are obtained since less of the reactants and products are complexed with the catalyst and lost thereby. Recycled sludge can amount to about 10 to about 100 weight percent or more of the branched-chain alkene charged. Preferably, about 50 to about 100 weight percent of recycle sludge is charged based upon the weight of the branched-chain alkene charged.

The alkylation reaction can be effected in a continuous or batch-wise manner. Effective contact time between catalyzed reactants is desirably about 10 to about 60 minutes. The precise time needed for effecting alkylation is dependent upon a number of factors, including amount of catalyst used, the ratio of aromatic hydrocarbon to branched-chain alkene employed, the temperature, and the like. Those skilled in the alkylation art can readily optimize such parameters.

The alkylation reaction product is charged to a separator where the catalyst sludge is removed upon completion of the desired degree of alkylation. When the sludge has been removed, the alkylate is washed, and the excess benzene is removed. Thereafter, the alkylate product can be sulfonated per se or can be subjected to fractional distillation to recover particularly desired fractions which are then subjected to sulfonation.

Alkylation of aromatic hydrocarbons with branched-chain alkenes as described heretofore is well-known to those skilled in the art. The foregoing disclosure of the alkylation conversion is provided for the purpose of defining those alkylates which are suitable to form sulfonic acids from which the sulfonates of the instant invention are derived.

According to one presently preferred embodiment the alkylation product formed by alkylating benzene, wherein about 5 to about 10 moles of benzene per mole of propylene tetramer dimer having about 10 to about 30 carbon atoms per molecule were employed, is subjected to fractional distillation to derive a cut of alkylate distillation products having a molecular weight of about 200 to about 275, plus another distillation cut of the total alkylate product having a molecular weight of about 300 to about 475. A mixture of such distillation cuts, particularly wherein about 0.5 to 2.0 parts by weight of the alkylate distillation product having a molecular weight of about 200 to about 275 are employed for each part by weight of the alkylate distillation product having a molecular weight of about 300 to about 475, is particularly suitable as an alkylation product to be sulfonated and employed according to the invention. Mixtures of such alkylate distillation products, other distillation cuts, as well as the entire alkylate product, or any mixture thereof, can be sulfonated and employed.

Once the alkylation conversion has been carried out and the desired alkylate products recovered, the alkylate products are sulfonated to form a sulfonic acid. As pointed out heretofore, the alkylate product which is sulfonated can be the total alkylate product formed in the alkylation reaction, can be certain distillation cuts of the alkylation product, or can be mixtures of such alkylate products. Also, certain other high molecular weight alkylatable hydrocarbons such as the precursors to mahogany sulfonates can be admixed with such alkylate products if desired.

The sulfonation conversion of the alkylate product to the sulfonic acid derivatives thereof can be by any procedure heretofore known to the art for the sulfonation of a sulfonatable hydrocarbon. A number of sulfonation procedures are known in the art wherein $SO_3$, sulfuric acid or oleum, mixtures of $SO_3$ and $SO_2$, or organic sulfonating agents containing $SO_3$ are employed as a sulfonating agent. Furthermore, the sulfonation can be carried out in either a batch-type process or a continuous falling film reaction process. When $SO_3$ is employed as a sulfonating agent, the mole ratio of $SO_3$ to alkylate product is suitably about 1:1 to about 1.5:1. Thus each molecule of the product should have on the average about 1 or more sulfonic acid groups thereon following the sulfonation reaction.

The sulfonic acids formed by the sulfonation reaction are then converted to the respective sulfonates by reacting with a base component. The conversion to the sulfonates is readily effected by simply admixing the base component with the sulfonic acids. This can be accomplished by any means known to the art for the conversion of sulfonic acids to sulfonates. Such procedures are well-known to those skilled in the art.

The base component employed in this invention is selected from the alkali metal hydroxides, ammonium hydroxides, and the alkali metal carbonates. Examples of such base components include: NaOH, KOH, LiOH, $Na_2CO_3$, $NaHCO_3$, $NH_4OH$, $K_2CO_3$, and the like. Sodium hydroxide is presently particularly preferred as a base component.

The improved anionic waterflood additives of the instant invention are overbased alkylate product sulfonates, wherein the sulfonates are derived as heretofore set forth.

Other high molecular weight natural or synethetically derived sulfonates can be added to the alkylate sulfonates of this invention if desired. Such high molecular weight sulfonates include those which are water-insoluble and oil-soluble, generally having molecular weights in the range of about 400 to about 600. If such high molecular weight sulfonates are admixed with the alkylate sulfonates of the instant invention, preferably about 0.2 to about 1.0 parts by weight of the high molecular weight oil-soluble sulfonate are employed for each part by weight of branched-chain alkylaromatic alkylate sulfonate employed.

The overbased sulfonates have excess base components added beyond that needed to neutralize the sulfonic acid precursors to the sulfonates such that the ratio: "weight of excess base component/weight of sulfonate" is about 0.03 to about 3.0. Overbased sulfonates wherein the ratio is about 0.20 to about 1.0 are presently particularly preferred.

Thus, when the sulfonates are merely neutralized and injected as an aqueous mixture of the neutralized product into the petroliferous formation, a sufficient amount of the aqueous base component must be added in a second slug to insure that the waterflood additive composition formed in situ in the formation is overbased and is in the prescribed ranges.

In describing the use of the anionic waterflood additives of the instant invention, two methods of injecting the additives into a petroliferous formation will be discussed. However, it should be understood that neither method is presently particularly preferred over the other, and that the particular method which is chosen of a particular application will depend to a large extent upon the facilities available at the well site.

One method of employing the anionic waterflood additives of the instant invention involves injecting an aqueous slug containing about 0.5 to about 25 weight percent of the alkylate product sulfonate through a well bore into a petroliferous subterranean formation from which additional hydrocarbon is to be recovered. After the sulfonate slug has been dispersed into the formation, an effective amount of an aqueous base component mixture in the form of a second slug is introduced into the formation to form an aqueous mixture in situ in the subterranean formation containing about 0.5 to about 25 weight percent of the overbased waterflood additive composition. When employing such a method, a sufficient amount of the base component containing mixture must be injected into the formation to assure that the waterflood additive will be overbased such that the "ratio" is about 0.03 to about 3.0. If sufficient base component is not added to reach the lower minimum ratio of about 0.03, desirable results are not obtained. Likewise, problems of viscosity and handling of materials are encountered when the amount of overbasing is above the upper ratio value of about 3.0.

A second system which can be employed in employing the anionic waterflood additive compositions involves producing the overbased sulfonate, admixing with water, injecting the aqueous mixture containing from about 0.5 to about 25 weight percent of the overbased alkylates product sulfonate directly into the petroliferous formation as one slug. When employing this procedure, the same limitations as to the overbasing ratio applies as to the procedure heretofore described.

While the overbased sulfonates demonstrate remarkable properties as waterflood additives in the second system described, additional tertiary oil can be recovered from the subterranean petroliferous formation by injecting an effective amount of an aqueous mixture containing a base component into the formation which has previously been contacted with the overbased sulfonate composition. The amount and concentration of the aqueous base component containing mixture employed can vary widely. However, desirable results are obtained when the concentration of the base component in the mixture is about 0.5 to about 50 percent by weight and the amount of mixture injected into the formation is about 10 to about 1000 volume percent based on the amount of sulfonate containing slug injected into the formation.

As heretofore stated, the material injected into the petroliferous formation is an aqueous mixture containing about 0.5 to about 25 weight percent of the overbased alkylate product sulfonate waterflood additive. Particularly desirable results are obtained when the aqueous mixture injected into the formation contains about 3 to about 15 weight percent of the overbased sulfonate.

Difficulties are sometimes encountered in the formation of the aqueous mixture due to the solubility characteristics of the anionic waterflood composition. When such solubility problems are detected, one can add an effective amount of any suitable water-soluble solubilizing agent to promote solubility. The amount of water-soluble solubilizing agent required in such instances will vary widely, but will generally be within the range of about 0.5 to about 25 weight percent based on the weight of the total composition. Examples of some suitable water-soluble solubilizing agents include lower alcohols such as methanol, ethanol, 2-propanol, and the like; aryl sulfonates, such as sodium benzene sulfonate, sodium xylene sulfonate, sodium toluene sulfonates, sodium hexylbenzene sulfonates, sodium octylbenzene sulfonates, and the like; alcohol ethoxylates wherein the molecule contains about 30 to about 90 weight percent of ethylene oxide and the alcohol constituent contains about 2 to about 20 carbon atoms; lower olefin derived sulfonates derived from alkenes such as butenes and pentenes and the like; and ethoxylated alkylphenols, such as octylphenol.

It is to be understood that any sulfonates added as such water-soluble solubilizing agents are not to be taken into account in determining the ratio: "weight of excess base component/weight of sulfonate." However, any high molecular weight oil-soluble sulfonates admixed with the alkylate product sulfonate are to be taken into account in determining the ratio.

In order to more fully explain the present invention, the following examples are provided. However, it is to be understood that the examples are not intended to function as a limitation on the invention as described and claimed in the application.

EXAMPLE 1

Exemplarily, a propylene tetramer is prepared according to the following procedure:

Dimerization of Propylene Tetramer Olefin (a) Conditions for maximum conversion:

| | |
|---|---|
| Sludge/Dodecene Ratio | 3.0/1 |
| Maximum Reaction Temp. | 120°F |
| Post Stir, Minutes | 60 |

(b) Typical Charges:

| | |
|---|---|
| Dodecene, gms. | 600 |
| Recycle Sludge, gms. | 1800 |

The dodecene is charged to a baffled stirred reactor equipped with a dropping funnel. The desired quantity of stock alkylation sludge is weighed and transferred to the dropping funnel, equipped with a silica gel packed breather.

Agitation of the dodecene is started and addition of alkylation sludge is started at an even rate so as to require 30 ± 1 minutes. The reaction mass is maintained at the desired temperature by means of a cold water bath. After all of the sludge is added, the reaction mass is stirred for one hour. At the end of this period, the entire mass is transferred to a 4 liter separatory funnel and allowed to settle for two hours. The crude dimer is separated from the sludge and each portion is weighed.

The crude dimerization reaction product mixture is generally used as-is to alkylate benzene. It has a typical composition as follows:

| | |
|---|---|
| Benzene (from recycle sludge) | 32% |
| Pre-dimer Light Olefin (non-dimerized) | 14% |
| Dimer Olefin | 54% |

Alkylation of Crude Dimer Olefin Mixture (a) Reaction Conditions:

| | |
|---|---|
| Benzene/Dodecene Ratio | 3/1 by weight |
| % AlCl$_3$ on Dodecene | 7 |
| % Water on AlCl$_3$ | 4 |
| Max. Reaction Temp., °F | 100 |

The required benzene is charged to a 5 liter flask equipped with a stirrer, thermometer and dropping funnel. The required amount of AlCl$_3$ catalyst and water and all of the dimer sludge separated in the dimerization step is weighed. The crude dimer phase is transferred "as is" to a dropping funnel and the level in the funnel is marked with a wax crayon into four equal portions.

Agitation of the benzene is started and the temperature is adjusted to 85°F. Fifty percent of the dimer sludge is added to the benzene followed by 50 percent of the total required AlCl$_3$ and then 50 percent of the total required water.

The dimer from the dropping funnel is fed at an even rate so as to require 30 ± 2 minutes to complete the addition of the entire charge. The reaction mass is maintained at the desired temperature by means of a cold water bath.

A portion of dimer sludge, AlCl$_3$ and water (about 16.7 percent) of the required total of each is charged after one-fourth, one-half, and finally three-fourths of the dimer is added to the reaction flask as indicated by the level in the dropping funnel. After the end of the dimer addition, stirring is stopped, and the reaction mass is allowed to settle for 30 minutes.

The crude layer is decanted from the AlCl$_3$ sludge and the weight of each recorded.

Using 93% sulfuric acid, the acid crude layer is treated for 10 minutes, followed by settling for 10 minutes. The acid crude alkylate is decanted from the sulfuric acid sludge and neutralized by mixing for 10 minutes with a 25 percent solution of caustic. Settling for 30 minutes is effected.

The neutralized crude alkylate is charged to the TBP stills and fractionated using the following cut-points:

| | |
|---|---|
| Benzene, °F at Atm. | 0–290 |
| DEBISOL (low MW alkyl aromatics) °F at 20 mm | 0–225 |
| AB-515 product, °F at 20 mm | 225–390 |
| H-380-D product | Pot Bottoms |

On a benzene-free basis, the crude alkylation product mixture has the following typical composition:

| | |
|---|---|
| Low MW alkyl aromatics, % Wt. | 17 |
| Dodecylbenzene (AB-515) | 47 |
| H-380 Alkylbenzene | 36 |

A blend of 1.25 parts by weight of the AB-515 product heretofore described per 1.0 part by weight of the H-380-D product heretofore described was sulfonated in a batch reactor with a stream of vaporized SO$_3$ plus air. Thirty-four grams of SO$_3$ was employed per 100 g of the mixture comprised of the AB-515 plus the H-380-D product mixture. The mixture of the alkylate distillation fractions was placed in the reactor and the vaporized SO$_3$ plus air stream (about 5 weight percent SO$_3$ in the air) was bubbled slowly into the alkylate distillation product mixture. Temperature was controlled at 45°C. The SO$_3$ plus air introduction was continued for 40 minutes.

The sulfonic acid mixture produced from the alkylate distillate mixture was neutralized by adding it to a 10 percent aqueous solution of sodium hydroxide to a pH 8-9 end point. The resulting sulfonate product had the following analysis:

| | |
|---|---|
| Wt. % Active Sulfonate | 42.0 |
| Wt. % Nonsulfonated Oil | 6.0 |
| Wt. % Sodium Sulfate | 1.7 |
| Wt. % H$_2$O | 50.3 |
| Average Equivalent Wt. of Sodium Sulfonate | 382 |

A series of runs was conducted to evaluate the oil recovery properties of the anionic waterflood additives as prepared. In each run, 12 × 2 × 2 inches Berea sandstone cores were evacuated under vacuum and then saturated with 1 percent sodium chloride brine. The brine saturated cores were reduced to irreducible water saturation with Blandol product (a highly refined mineral oil) and then waterflooded to residual oil saturation with sodium chloride brine solution.

The waterflood additives were then injected into the cores as aqueous mixtures containing amounts of sodium sulfonate and having overbasing ratios as noted in the following table. A quantity of each aqueous mixture corresponding to two pore volume percent of the core was injected. This was followed by a 10 percent pore volume slug of the 1 percent sodium chloride brine, followed by a 2 percent pore volume slug of 4 weight percent sodium hydroxide in aqueous solution. Tertiary waterflood was then conducted at 40 cc of brine per hour, a flow rate equivalent to 6–7 feet per day of reservoir flooding, to determine the effectiveness of the overbased anionic waterflood additives as oil recovery agents. The oil recovery runs were conducted at 130°F. A total of 1.5 pore volumes of brine was injected. In the following table, the column entitled "$\Delta S$" is the volume of oil produced as a percent of pore volume. The column entitled "ratio" is the value of the ratio "weight of excess base component/ weight of sulfonate."

Data are presented in the following, Table I.

| Run No. | Sulfonate | Ratio | $\Delta S$ |
|---|---|---|---|
| 1 | 3.72% Sulfonate derived from H-380-D product plus 2.98% sulfonate derived from ABS-515 product. | 0.6 | 2.1 |
| 2 | 4.7% of sulfonate product derived from alkylate mixture of H-380-D product plus ABS-515 product plus 2% Witco Petronate C sulfonate product*. | 0.6 | 11.6 |

*Witco Petronate C product is a 500–550 average molecular weight natural oil-soluble sulfonate derived by treating a lubricating oil refinery fraction with sulfuric acid.

This example demonstrates that the overbased anionic waterflood additives of the instant invention are effective to recover additional oil. Run 2 further demonstrates that addition of a high molecular weight sulfonate to the overbased anionic waterflood additives recovers even more oil.

We claim:

1. A process for recovering hydrocarbons from a petroliferous formation, said process comprising:
   a. injecting into said formation an effective amount of an aqueous mixture containing from about 0.5 to about 25 weight percent of an overbased waterflood additive; and
   b. recovering displaced hydrocarbons from said formation, said waterflood additive consisting essentially of:
   c. a base component selected from the group consisting of NaOH, KOH, LiOH, $Na_2CO_3$, $NaHCO_3$, $NH_4OH$, $K_2CO_3$ and mixtures thereof;
   d. a branched-chain alkylaromatic alkylate sulfonate, prepared by
      1. alkylating an aromatic hydrocarbon, said aromatic hydrocarbon being represented by the formula
      $$Ar—(R)_n$$
      wherein Ar is benzene or a naphthalene ring having a valence of $n$, wherein R is methyl or ethyl and wherein $n$ is 0, 1, or 2, with a propylene tetramer dimer product containing from about 20 to about 30 carbon atoms per molecule, said aromatic hydrocarbon being employed in an amount equal to from about 1 to about 25 moles of said aromatic hydrocarbon per mole of said propylene tetramer dimer product to produce a branched-chain alkylaromatic alkylate;
      2. separating from said alkylate a first portion having a molecular weight from about 200 to about 275 and a second portion having a molecular weight from about 300 to about 475;
      3. sulfonating said alkylate to produce a sulfonic acid derived from a mixture containing from about 0.5 to about 2.0 parts by weight of said first portion per part of said second portion and from about 0.2 to about 1.0 parts by weight of a high molecular weight oil-soluble sulfonate precursor per part of said second portion; and,
      4. neutralizing said acid with said base component, said waterflood additive being overbased such that the ratio "weight of excess base component/weight of sulfonate" is about 0.03 to about 3.0.

2. The process of claim 1 wherein said aromatic hydrocarbon is benzene and wherein said benzene is employed in an amount equal to from about 5 to about 10 moles of said benzene per mole of said propylene tetramer dimer.

3. The process of claim 1 wherein said base component is sodium hydroxide.

4. The process of claim 1 wherein said high molecular weight oil-soluble sulfonate precursor is a mahogany sulfonate precursor.

* * * * *